United States Patent
Ohtsu et al.

(10) Patent No.: US 6,577,094 B2
(45) Date of Patent: Jun. 10, 2003

(54) OPTICAL PICKUP POSITION CONTROL METHOD

(75) Inventors: Hiroshi Ohtsu, Fukushima (JP); Hironobu Amemiya, Chiba (JP); Masaki Sugiyama, Saitama (JP)

(73) Assignee: Sony Computer Entertainment Inc., Tokyo (JP)

( * ) Notice: Subject to any disclaimer, the term of this patent is extended or adjusted under 35 U.S.C. 154(b) by 71 days.

(21) Appl. No.: 10/011,382

(22) Filed: Oct. 22, 2001

(65) Prior Publication Data

US 2002/0047679 A1 Apr. 25, 2002

(30) Foreign Application Priority Data

Oct. 24, 2000 (JP) .......................... 2000-324074

(51) Int. Cl.[7] .................................. G11B 7/08
(52) U.S. Cl. .................... 318/696; 369/44.11
(58) Field of Search ................. 318/685, 696; 369/32–39, 43, 44.11, 44.14

(56) References Cited

U.S. PATENT DOCUMENTS

| | | | | |
|---|---|---|---|---|
| 5,084,661 A | * | 1/1992 | Tanaka | 318/685 |
| 5,689,482 A | * | 11/1997 | Iida | 369/32 |
| 5,841,739 A | * | 11/1998 | Iida et al. | 369/32 |
| 5,848,036 A | | 12/1998 | Ishibashi et al. | |
| 5,862,110 A | * | 1/1999 | Yamamiya | 369/44.14 |
| 6,122,234 A | * | 9/2000 | Fujitani et al. | 369/50 |
| 6,445,649 B1 | * | 9/2002 | Saito et al. | 369/30.1 |

FOREIGN PATENT DOCUMENTS

| | | |
|---|---|---|
| EP | 1 043 717 | 10/2000 |
| WO | 97/26651 | 7/1997 |

* cited by examiner

*Primary Examiner*—Bentsu Ro
(74) *Attorney, Agent, or Firm*—Katten Muchin Zavis Rosenman

(57) ABSTRACT

An optical pickup position control method that uses a stepping motor to control the position of the optical pickup, and that makes it possible to reduce the out-of-step noise generated from the motor and to accurately position the optical pickup, has a first procedure that gives the motor a control command to move the optical pickup in the direction toward the maximum feed position by a feed amount that is smaller than the maximum feed amount from base position to the motor's maximum feed position; a second procedure that gives the motor a control command to move the optical pickup in the direction toward base position by the maximum feed amount; and a third procedure that gives the motor a control command to move the optical pickup in the direction toward maximum feed position by the center position feed amount from base position to center position.

6 Claims, 7 Drawing Sheets

OPTICAL PICKUP POSITION CONTROL METHOD

FIELD OF THE INVENTION

This invention concerns an optical pickup position control method that is used in an optical disk device that, in order to record and/or play information by shining an optical spot from an optical pickup onto an optical disk, uses a stepping motor to control the relative position of said optical disk and said optical pickup and is used if the relative position of the optical disk and optical pickup are to be open-loop-controlled.

BACKGROUND OF THE INVENTION

In recent years, from CDs, CR-ROMs, etc., high-information-recording-density DVDs, DVD-ROMs, DVD-Rs, etc. have come to be used as the optical disk in optical disk devices that record and/or play information by shining an optical spot from an optical pickup onto an optical disk. With such a high-recording-density optical disk, it is necessary to adjust the relative position of the optical disk and optical pickup with high precision. If tilt control between the disk and pickup is to be achieved, because the margin with respect to the skew of the optical disk is reduced, position control is achieved in which a stepping motor is used to adjust the skew angle of the optical pickup with respect to the optical disk. In such a situation, because the adjustment range for the skew angle is small, and to reduce manufacturing costs, in many cases open-loop control is adopted in which no sensors, etc. are used; specifically, tilt control of the optical pickup is done by giving the stepping motor a control command of a prescribed number of steps from a base position that serves as the base for the control. With such open-loop control, one cannot acquire the present position of the optical pickup by a sensor, etc. and add it to the control command, so if the optical pickup is to be moved to the center position where the pre-measured jitter amount of the output signal of the optical pickup is at its minimum, a procedure such as the following is adopted.

Taking the number of steps to give a control command from the base position as far as the maximum feed position of the stepping motor to be 100 steps and the number of steps to give a control command from the base position to the center position to be 50 steps, together with starting the optical disk device, a control command of 100 steps toward the base position is input to the stepping motor, and the optical pickup moves to the base position. Next, a control command of 50 steps from the base position toward the maximum feed position is input to the stepping motor, and the optical pickup is positioned in the center position.

By performing such control, when the optical pickup is center-positioned, it first is returned to the base position and then is positioned to the center position, which provides the advantage that the optical pickup can be surely centered at startup or when a reset is made, regardless of the position of the optical pickup when the optical disk device stops.

However, in the above-described optical pickup position control method, there is the problem that even though the optical pickup may reach the base position, depending on the position of the optical pickup when the optical disk device stops, the stepping motor will continue its feed operation according to the control command, so the stepping motor of the feed mechanism of the optical pickup will get out of step, generating out-of-step noise. That is, if for example the optical pickup is in the feed position corresponding to 10 steps of the stepping motor from the base position when during operation of the optical disk a system restart is requested by pressing the reset button, etc., and the optical disk device stops, then upon restart a 100-step control command toward the base position is input to the stepping motor, and the stepping motor initiates feed operation of the optical pickup. Then the stepping motor performs the right feed operation for the first 10 steps, and for the remaining 90 steps the optical pickup reaches the base position, and out-of-step noise is continuously generated from the stepping motor.

It is an object of the present invention to provide an optical pickup position control method that can reduce the out-of-step noise generated from the stepping motor and can accurately position the optical pickup.

SUMMARY OF THE INVENTION

The optical pickup position control method of the present invention uses a stepping motor to control the relative position of an optical disk and an optical pickup and has a first procedure that gives said stepping motor a control command that moves said optical pickup, by a feed amount that is smaller than the maximum feed amount from a base position that is the base for the control as far as the maximum feed position of said stepping motor, in the direction from said base position to said maximum feed position, a second procedure that gives said stepping motor a control command that moves said optical pickup by said maximum feed amount in the direction toward said base position, and a third procedure that gives said stepping motor a control command that moves said optical pickup in the direction from said base position toward said maximum feed position by a center position feed amount from said base position as far as the center position that yields the pre-measured optimum jitter characteristics of the output signal of said optical pickup. The center position feed amount in the third procedure is obtained by using a standard disk to measure, in the stage of manufacturing the disk device, the center position at which the jitter characteristics of the optical pickup are at their best. The center position feed amount that is obtained is stored in an E2PROM or other memory provided in the optical disk device and is called and used as necessary in executing the optical pickup position control method of the present invention.

In positioning by open-loop control, the optical pickup position control method of this invention is adopted in the following cases.

(1) If a restart is done during execution of the optical pickup position control method of this invention.

(2) If during execution of the optical pickup position control method of this invention the master switch of the optical disk device is turned off and the supply of power to the optical disk device is cut off.

(3) If, in operating the optical disk device, detection of recorded information is done by the optical pickup at a position displaced from the normal center position.

In accordance with the method of the present invention, by the fact that before the second procedure a first procedure is carried out in which a control command is given for a feed amount, in the direction from the base position to the maximum feed position, that is smaller than the maximum feed amount, even if upon restart the optical pickup is near the base position, by the first procedure the optical pickup first moves in the direction from the base position to the maximum feed position. Therefore one can reduce the out-of-step condition of the stepping motor in the second procedure by the portion it moved in the first procedure, the time during which out-of-step noise is continuously generated can be reduced, and by the second procedure the optical pickup can be returned surely to its base position. In addition, because the optical pickup is returned to its base position by the second procedure, the optical pickup can be surely positioned in the center position just by, in the third procedure, giving the stepping motor the center position feed amount as a control command.

In the foregoing, it is desirable that the feed amount in the first procedure be the difference between the maximum feed amount and the center position feed amount. By thus setting the feed amount in the first procedure to the difference between the maximum feed amount and the center position feed amount, even if a restart is done in a state in which the optical pickup is positioned at the center position, it will become equal to the maximum feed amount if said difference is added to the center position after the restart. Therefore, the optical pickup can be moved to the maximum feed position by the feed position due to the first procedure, and even if feeding is done by the maximum feed amount of the second procedure, the optical pickup can be returned to the base position without getting out of step. Also, if, following said third procedure, an optimum position adjustment procedure is performed that detects the jitter value of the output signal of the optical pickup, position-adjusts said optical pickup so that the jitter characteristics for said optical disk are optimum, and stores the adjustment feed amount from the base position for the adjusted optimum position, it is desirable that it have a fourth procedure that, upon termination of recording and/or playback of information by the optical pickup, gives the stepping motor a control command that moves the optical pickup by the difference between this adjustment feed amount and the center position feed amount.

Thus, the optimum position adjustment procedure is a procedure that is carried out because it cannot be said that the center position set based on the measurement using a standard disk is necessarily the optimum position in relation to the optical disk that is actually used; it can be done by user operation, but it can also be done automatically by the optical disk device following the third procedure. This is because the optical disk that is actually used may be different from the standard disk because of deviation of the center hole, warping of the disk, etc. In addition, the adjustment position feed amount is stored in a RAM, etc. provided on the optical disk device, and it may be erased after termination of the fourth procedure. In addition, "upon termination of recording and/or playback of information by the optical pickup" in the fourth procedure refers to cases in which a system that includes the optical disk device is initialized, by for example a reset button, while information recorded on the optical disk is being played back or information is being recorded onto the disk. Because such a fourth procedure moves the optical pickup by the difference between this adjustment feed amount and the center position feed amount upon termination of recording and/or playback of information by the optical pickup, before the system is shut down by the reset button, etc., the optical pickup can be returned to the center position, and the aforesaid generation of out-of-step noise can be surely suppressed when the first procedure and second procedure are executed upon restart.

Furthermore, it is desirable that control of the relative position of said optical disk and optical pickup be tilt control between the two, and it is desirable that said tilt control be control of said optical disk in the radial skew direction. That is, there is available as the optical pickup positioning control in an optical disk device tracking servo control, focus servo control, slide feed control, and tilt control, and closed-loop control, in which the control is done while detecting the output signal from the optical pickup, is adopted in tracking servo control, focus servo control, and slide feed control. In contrast to this, normally tilt control is done only as initial control upon startup, and open-loop control is often adopted for reasons of cost, etc., and it is desirable for adopting this invention. For tilt control, one could have control in the tangential skew or radial skew direction, and the precision of detection of the optical pickup due to variability in the optical disk, such as warping, bias of the center hole, etc. is greatly improved by doing control in the radial skew direction. Therefore, by performing control in the radial skew direction in this way, it is possible to control the position of the optical pickup by the necessary minimum and to great precision.

Figure 1:
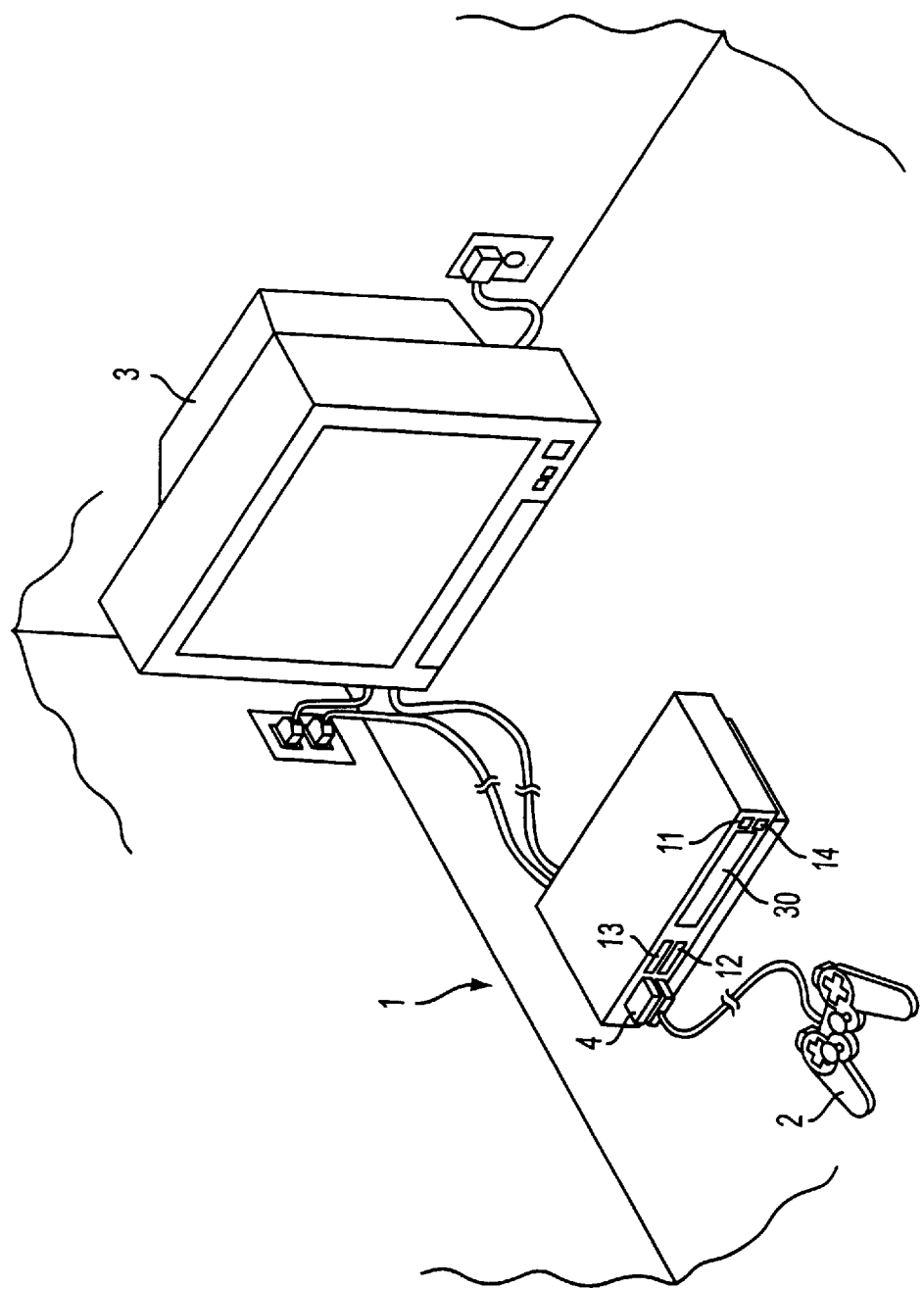
FIG. 1 is a rough perspective view of an entertainment device of an embodiment of the present invention.

EXPLANATION OF THE SYMBOLS 32 optical pickup
100 optical disk
BP base position
CP center position
MP maximum feed position
RS radial skew direction
S4 first procedure
S6 second procedure
S8 third procedure
S11, S12 optimum position adjustment procedure
S17 fourth procedure

DETAILED DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 shows an entertainment device 1, which is an electronic device for which is adopted the optical pickup position control method of an embodiment of the present invention. Entertainment device 1 executes a game program when a user calls up a game program, etc. recorded on a CD, CD-ROM, DVD, DVD-ROM, or the like and gives instructions by manipulating an operation controller 2. The output of said entertainment device 1 is connected to a television receiver or other display device 3, and the entertainment device screens during execution are displayed on device 3. The electric power to entertainment device 1 comes from a source such as the commercial public power supplied to homes, and entertainment device 1 is started by turning on a master switch, not pictured, that is provided on the rear surface of the device and pressing a power switch 11 provided on the front surface of the device. Power switch 11 may also function as a reset button when it is pressed during operation of entertainment device 1. Controller slot 12 and card slot 13 are provided on the front surface of entertainment device 1; operation controller 2 is connected to controller slot 12, and memory card 4 is connected to card slot 13. Optical disk device 30 is provided near controller slot 12 and card slot 13, which are provided on the front surface of the device. Optical disk device 30 is a disk-loading optical disk device in which, by manipulating operation switch 14, a disk tray advances and retracts from entertainment device 1.

Figure 2:
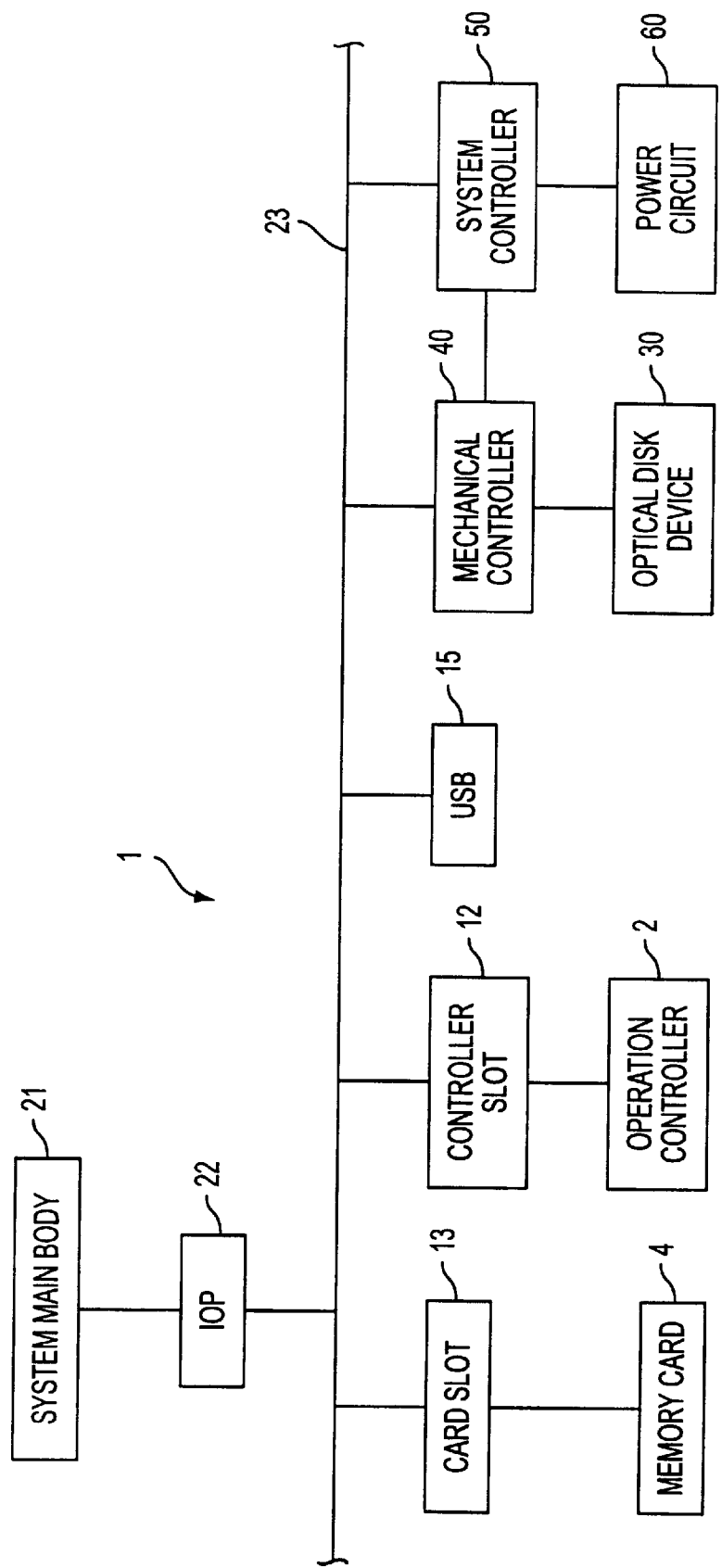
FIG. 2 shows the internal structure of the entertainment device illustrated in FIG. 1.

As shown in the block diagram of FIG. 2, the device main body inside entertainment device 1 has system main body 21 as the main board on which the CPU is mounted, and an I/O port 22, which is connected to the system main body 21. Connected to I/O port 22, via bus line 23, are controller slot 12, card slot 13, and USB port 15, etc., as well as mechanical controller 40 and system controller 50. System main body 21 controls the entertainment device as a whole and computation processing of game programs and other software; through I/O port 22, including the operation control of operation controller 2 and other external devices connected to controller slot 12, card slot 13, and USB port 15, etc. and of mechanical controller 40 and system controller 50, and it processes signals output from external devices, etc. connected to I/O port 22. Mechanical controller 40 performs operation control of optical disk device 30 as described in greater detail below, and optical disk device 30 is connected to bus line 23 via mechanical controller 40. System controller 50 controls power source circuit 60 and manages the power supply state of entertainment device 1. Mechanical controller 40 and system controller 50 have a direct port connection for exchanging signals of two levels, high and low, without going through bus line 23.

Figure 3:
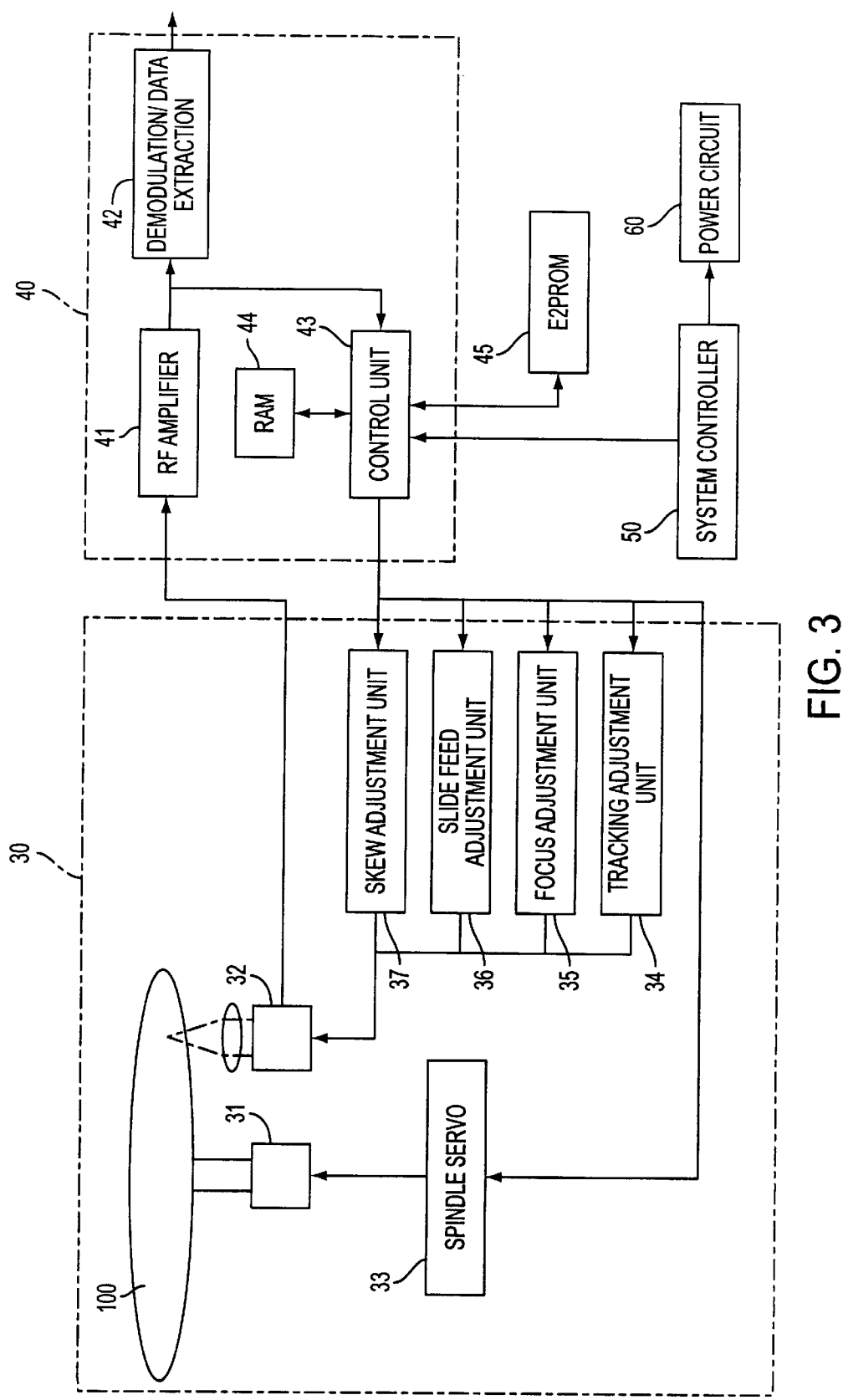
FIG. 3 shows the structure of the optical disk device, and the mechanical controller that controls said disk device.

As shown in FIG. 3, optical disk device 30 has spindle motor 31, optical pickup 32, spindle servo unit 33, tracking adjustment unit 34, focus adjustment unit 35, slide feed adjustment unit 36, and skew adjustment unit 37. Also, although not pictured in FIG. 3, provided on optical disk device 30 are a disk tray loading mechanism for extending and retracting the disk tray from entertainment device 1, and a raising and lowering mechanism that raises and lowers spindle motor 31 and optical pickup 32 so that they do not interfere with the disk tray. Spindle motor 31 rotates an optical disk 100 mounted in the disk tray Provided on the end of the rotation shaft of said spindle motor 31 is a chucking member that engages with the center hole of optical disk 100. Spindle motor 31 is rotation-controlled by spindle servo unit 33 in such a way that information can be detected by optical pickup at a fixed linear speed 32 regardless of the radial-direction position of optical pickup 32 with respect to optical disk 100. Tracking adjustment unit 34 has a two-axis device that adjusts the objective lenses that constitute optical pickup 32 so that the optical spot from optical pickup 32 is shined accurately onto the tracks of optical disk 100, and an actuator that imparts driving force to this two-axis device. Focus adjustment unit 35 performs position adjustment of optical pickup 32 so that the depth of focus of the optical spot from optical pickup 32 is fixed with respect to the information recording surface of optical disk 100, and has an advance-and-retract mechanism that position-adjusts optical pickup 32 with respect to the information recording surface of optical disk 100 in the direction of approaching and withdrawing from it, and an actuator that imparts driving force to this advance-and-retreat mechanism. Slide feed adjustment unit 36 adjusts the position, in the radial direction of optical disk 100, of optical pickup 32 by track jumping, etc.; although not pictured in the diagram, it has a thread feed mechanism that consists of a rack that extends along the radial direction of optical disk 100 and a gear that engages with this rack, and a stepping motor that causes this gear to rotate. Optical pickup 32 is attached on the rack, and when the gear turns by the stepping motor, optical pickup 32 moves by means of the rack along the radial direction of optical disk 100. If track jumping is to be done, first, by the two-axis device of tracking adjustment unit 34, the center of the optical axis of the optical spot is aligned on the track to which the jump is to be made, then optical pickup 32 is slid by the slide feed mechanism.

Figure 4A:
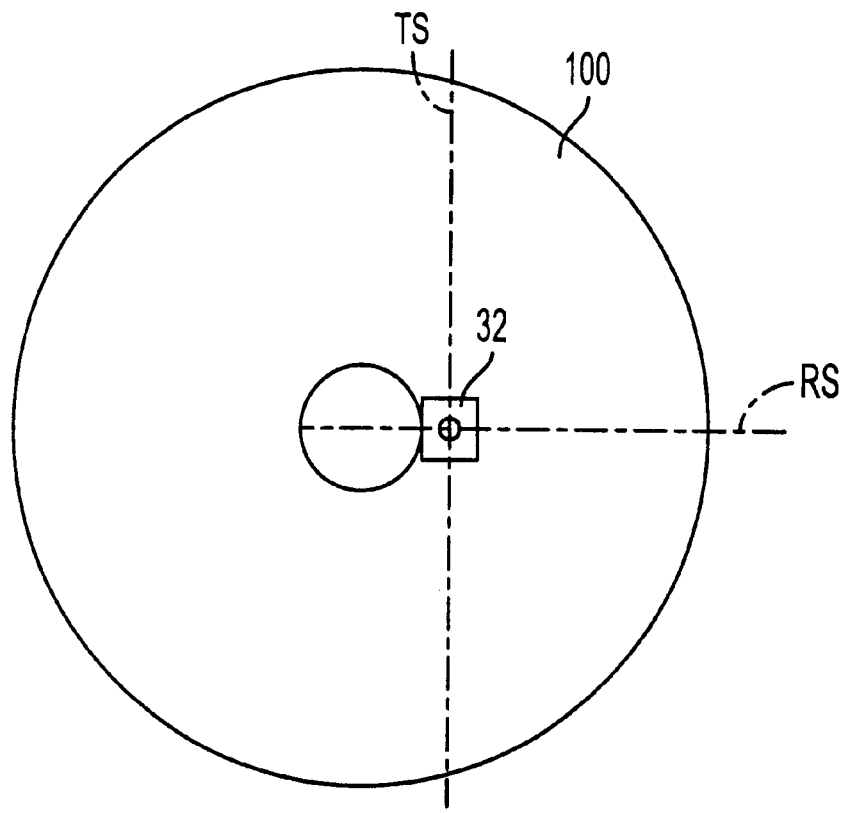
FIGS. 4A and 4B explain the method of skew adjustment associated with the tilt control of the present invention.
Figure 4B:
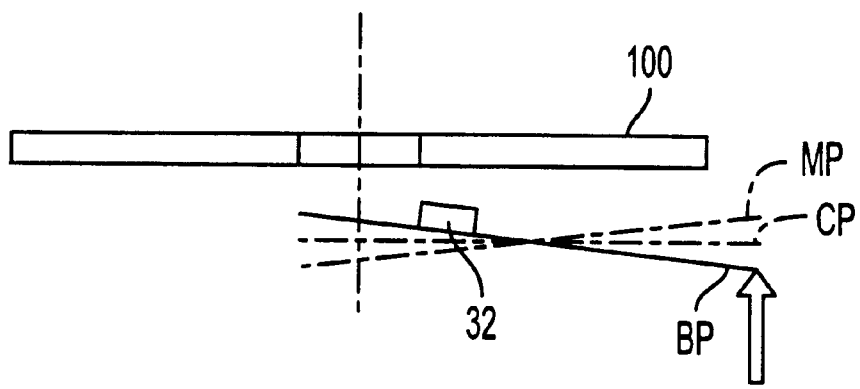

Skew adjustment unit 37 adjusts the tilt of optical pickup 32 with respect to optical disk 100 so that the optical spot shined from optical pickup 32 is incident perpendicular to optical disk 100. As shown in FIGS. 4A and 4B, and in particular FIG. 4B, there is provided a skew angle adjustment mechanism that adjusts the irradiation angle of the optical spot shined from optical pickup 32, taking as the fulcrum the center of the slide feed position CP of said optical pickup 32, and the angle of optical pickup 32 with respect to optical disk 100 in the range from the base position BP to the maximum feed position MP; and a stepping motor (not pictured) that serves as the drive source for this skew angle adjustment mechanism. Also, as shown in FIG. 4A, this skew adjustment unit 37 makes adjustments in radial skew direction RS, which is the radial direction of optical disk 100. Skew adjustment unit 37 does not make any adjustments for the tangential skew direction TS, which is the direction of the tangent to the circle.

Returning to FIG. 3, mechanical controller 40 has RF amplifier 41, demodulation/data extraction unit 42, control unit 43, and RAM-44. Controller 40 is connected directly to system controller 50 by the aforesaid port connection, and it is connected to E2PROM-45, which is mounted on the circuit board that includes mechanical controller 40. RF amplifier 41 amplifies the RF signal input from optical pickup 32 of optical disk device 30 and outputs it to demodulation/data extraction unit 42. Demodulation/data extraction unit 42 demodulates the RF signal and extracts the necessary data, and the extracted data is output via bus line 23 and I/O port 22 to system main body 21 and is processed by system main body 21. Control unit 43 outputs control commands to aforesaid spindle servo unit 33, tracking adjustment unit 34, focus adjustment unit 35, slide feed adjustment unit 36, and skew adjustment unit 37 of optical disk device 30, and generates control commands as necessary, storing data in RAM 44 and calling out information recorded in E2PROM 45. The RF signal of optical pickup 32 that is amplified by RF amplifier 41 is input to control unit 43 and is used for the generation of control commands.

Here, the control commands by control unit 43 to spindle servo unit 33, tracking adjustment unit 34, focus adjustment unit 35, and slide feed adjustment unit 36 are generated while judging the state of detection of optical pickup 32 using the RF signal, and closed-loop control that employs the feedback value of the RF signal is adopted for the control of these adjustment units 33–36. Meanwhile, the control commands to skew adjustment unit 37 are generated based on the numerical information recorded in E2PROM 45, and open-loop control is adopted, which does not consider the state of detection by the RF signal. Recorded in E2PROM 45 are, as shown in FIG. 4A, the maximum feed amount to move optical pickup 32 from base position BP as far as maximum feed position MP, and the center position feed amount to move optical pickup 32 from base position BP as far as center position CP; specifically, these feed amounts are stored as numbers of pulse steps to drive the stepping motor.

Figure 5:
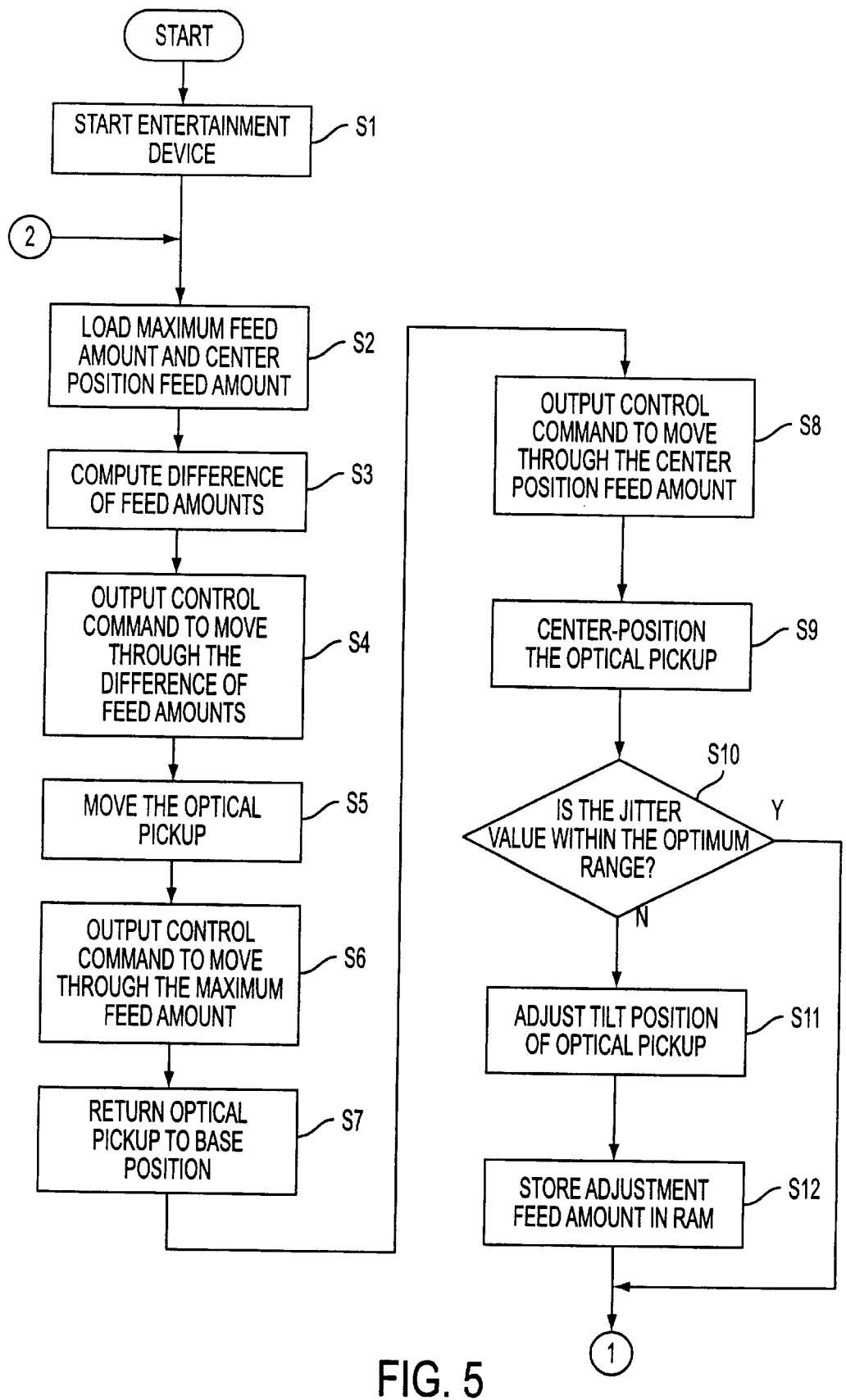
FIG. 5 is a flowchart illustrating the optical pickup positioning method of the present invention.
Figure 6:
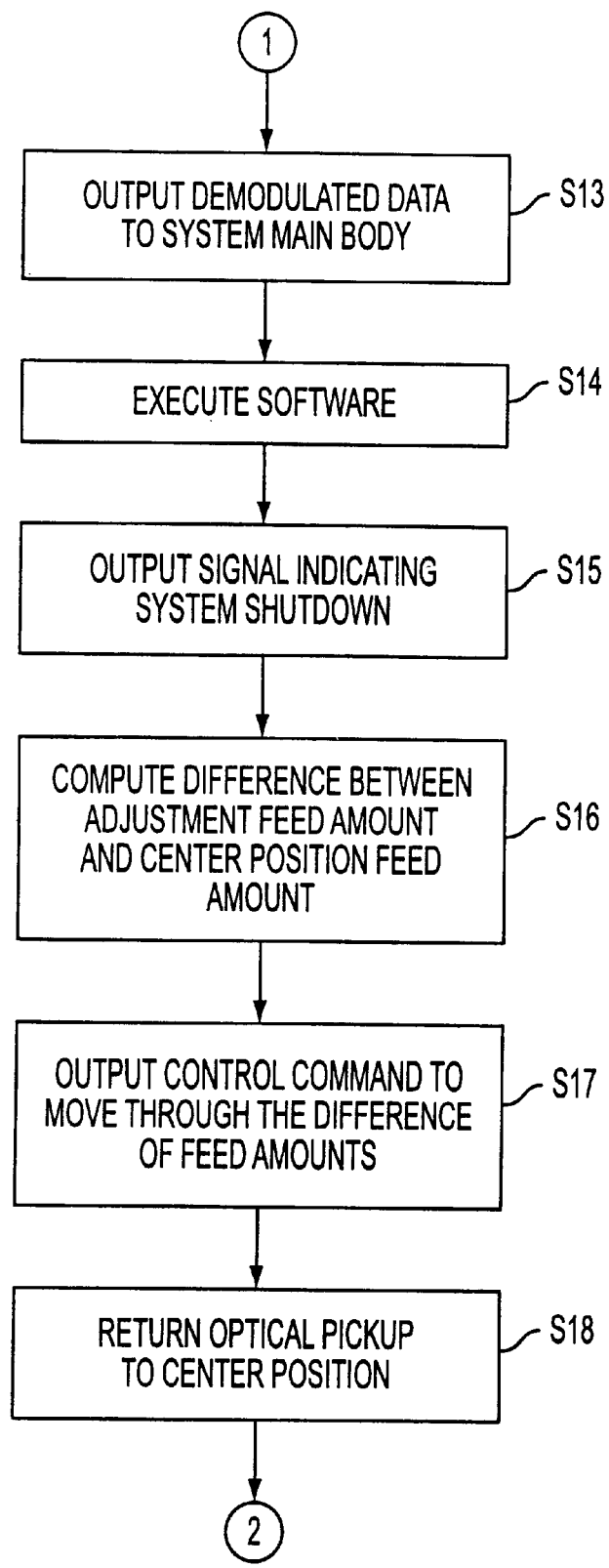
FIG. 6 is a flowchart illustrating the optical pickup position control method of the present invention.

Next, we describe, with reference to the flowchart in FIGS. 5 and 6, the position control procedure for optical pickup 32 by skew adjustment unit 37 and control unit 43 by which the optical pickup position control method of this invention is adopted in entertainment device 1 of the present invention.

(1) When the master switch on the back of entertainment device 1 is turned on and power switch 11 on the front of the device is pressed, electric power is supplied via power circuit 60 to system main body 21, mechanical controller 40, and optical disk device 30, and entertainment device 1 starts (processing S1).

(2) Control unit 43 of mechanical controller 40 loads into its own RAM 44 the maximum feed amount and center position feed amount that are recorded in E2PROM 45 (processing S2). The maximum feed amount is recorded as the number of pulse steps to be input to the stepping motor that constitutes skew adjustment unit 37, and is the number of steps to move the skew position of optical pickup 32 from base position BP to maximum feed position MP. Meanwhile, the center position feed amount is the number of steps to move the skew position of optical pickup 32 from base position BP to center position CP.

(3) When loading from E2PROM 45 is completed, control unit 43 computes the difference between the loaded maximum feed amount and the center position feed amount (processing S3), converts the obtained computation results to a feed amount in the direction from base position BP to maximum feed position MP, generates a control command, and outputs it to the stepping motor (processing S4: first procedure). For example, if the maximum feed amount is 100 steps and the center position feed amount is 50 steps, the control command is generated as a command to move 50 (100–50) steps in the direction from base position BP to the maximum feed position MP.

(4) Based on the control command from control unit 43, skew adjustment unit 37 operates the stepping motor and moves optical pickup 32 in the direction from base position BP to maximum feed position MP, that is, in the direction that increases the tilt angle of optical disk 100 to the tilt angle at the maximum feed position (processing S5).

(5) When the feed operation by the stepping motor is completed, control unit 43 continues and takes the maximum feed amount loaded in RAM 44 as the feed amount in the direction toward base position BP, generates a control command, and outputs it to the stepping motor (processing S6: second procedure). Based on said control command, skew adjustment unit 37 moves optical pickup 32 and returns it to base position BP (processing S7).

(6) When optical pickup 32 returns to base position BP, control unit 43 takes the center position feed amount loaded in RAM 44 as the feed amount in the direction from base position BP to maximum feed position MP, generates a control command, and outputs it to the stepping motor (processing S8: third procedure), and based on said control command, skew adjustment unit 37 positions optical pickup 32 in center position CP (processing S9).

(7) When center positioning of optical pickup 32 based on the above procedure is completed, control unit 43 detects the jitter value of the RF signal output from optical pickup 32 and decides whether the detected jitter value is in the optimum range of jitter characteristics (processing S10). Detection of the jitter value is done in the innermost circumferential part of optical disk 100, because the innermost circumferential part is where the beginning data to be read is recorded, and an RF signal can always be obtained therefrom.

(8) If it is decided that the detected jitter value is not within the optimum range, control unit 43 outputs a control command to skew adjustment unit 37, performs tilt position adjustment of optical pickup 32 (processing S11), and stores in RAM 44 the adjustment feed amount that is included in the control command (processing S12). If it is decided that the detected jitter value is within the optimum range, it skips processing S11 and S12 and proceeds as follows.

(9) When the above processing has been completed, the RF signal output from optical pickup 32 is demodulated into data for the computer by demodulation/data extraction unit 42, and the demodulated data is output to system main body 21 (processing S13). System main body 21 executes the game program or other software recorded on optical disk 100 (processing S14).

(10) If the user presses power switch 11 during execution of a game or other software and performs a reset, then before the system is shut down, system controller 50 outputs a signal to this effect to control unit 43 of mechanical controller 40 (processing S15).

(11) Control unit 43, into which this signal is input, computes the difference between the adjustment feed amount stored and RAM 44 and the center position feed amount (processing S16), generates a control command that takes the obtained computation results as the feed amount, and outputs it to the stepping motor (processing S17: fourth procedure).

(12) Based on the control command from control unit 43, skew adjustment unit 37 returns optical pickup 32 to center position CP (processing S18). When the return is completed, it initializes itself by a restart and resumes tilt control from processing S2.

Figure 7:
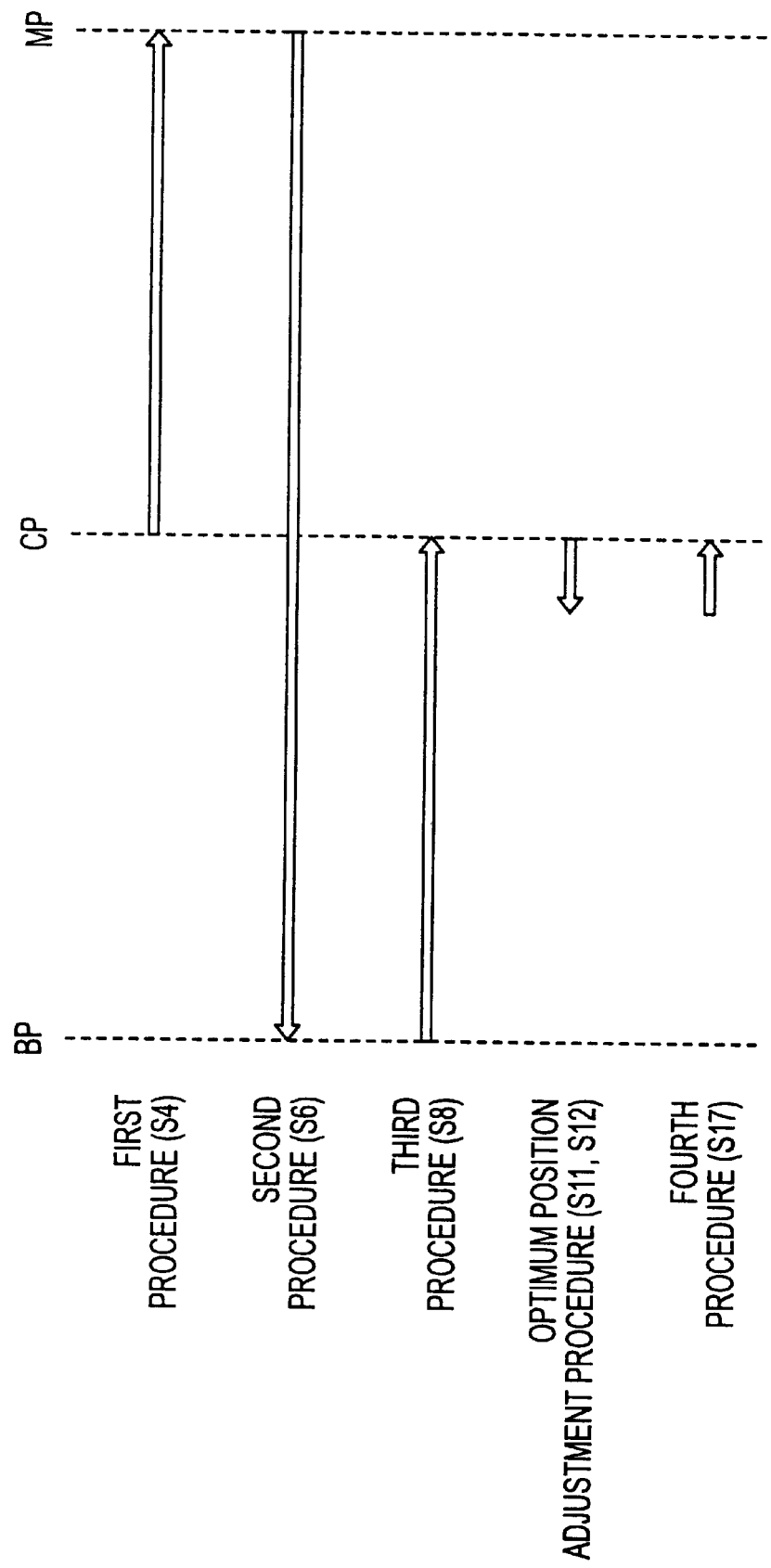
FIG. 7 is a model diagram showing the optical pickup position control method of the present invention.

To describe the above series of operations by their relationship with the feed amount of optical pickup 32, as shown in FIG. 7, optical pickup 32, which at the start is near center position CP, is fed by first procedure S4 as far as maximum feed position MP, then is fed by second procedure S6 as far as base position BP, and finally is fed by third procedure S8 to center position CP. If optimum position adjustment procedure S11 and S12 are carried out and optical pickup 32 moves to a position displaced from center position CP, upon system shutdown, by fourth procedure S17, optical pickup 32 returns to center position CP, then a restart is begun.

This embodiment of the present invention as described above has the following effects.

Namely, because prior to second procedure S6 the first procedure S4 is carried out in which a control command is given in the direction from base position BP to maximum feed position MP for a feed amount that is smaller than the maximum feed amount, upon restart, even if optical pickup 32 is near base position BP, by first procedure S4 optical pickup 32 first moves in the direction from base position BP to maximum feed position MP. Therefore the out-of-step condition of the stepping motor in second procedure S6 can be made smaller by the amount by which it moves in first procedure S4, the time during which out-of-step noise is continuously generated can be reduced, and optical pickup 32 can be surely returned to base position BP by second procedure S6.

And because optical pickup 32 returns to base position BP by second procedure S6, optical pickup 32 can be accurately positioned in center position CP by, in third procedure S8, giving the stepping motor the center position feed amount as a control command.

In addition, because the feed amount in first procedure S4 is set as the difference between the maximum feed amount and the center position feed amount, by first procedure S4, optical pickup 32 moves to maximum feed position MP, and optical pickup 32 can be returned to base position BP by second procedure S6 without getting out of step.

And after optimum position adjustment procedure S11 and S12 is carried out, optical pickup 32 returns to center position CP by fourth procedure S17 before the system shuts down by pressing the reset button, etc., so even if first procedure S4 and second procedure S6 are carried out after restart, feed operation can be done without getting out of step, and the generation of out-of-step noise by the stepping motor can be surely prevented.

And because the tilt control by skew adjustment unit 37 is control of the radial skew direction RS, by carrying out tilt control of this direction, the detection precision of optical pickup 32 due to variability such as warping or center hole bias of optical disk 100 can be greatly improved.

Moreover, this invention is not limited to the above embodiment but also includes modifications such as, but not limited to the following.

In the above described embodiment, the feed amount in the first procedure is set as the difference between the maximum feed amount and the center position feed amount. However, in order to shorten the time during which out-of-step noise is generated at least in the second procedure, the feed amount in the first procedure may be set appropriately as a value that is smaller than the maximum feed amount.

Also, in the above described embodiment, after the third movement procedure S8, the optimum position adjustment procedure of S11 and S12 to optimize the jitter characteristics of the RF signal from optical pickup 32 is performed automatically by decision processing S10, then fourth procedure S17 is performed, which returns optical pickup 32 to the proper center position. However, fourth procedure may be carried out even if the user of the entertainment device carries out the optimum position adjustment procedure as an adjustment procedure that is done autonomously.

In addition, in the above described embodiment, this invention is adopted as operation control of skew adjustment unit 37, but this invention may also be adopted in other control systems, as long as positioning is done to high precision by open-loop control.

Also, in the above embodiment, optimum position adjustment procedure S11 and S12 is carried out after first through third procedures S4, S6, and S8 in the initial operation, but depending on the recording density of the information on the optical disk, this need not always be done.

Moreover, the specific structure and shape, etc. in implementing this invention may be set to another structure, etc. as long as it is within the range that can achieve the purpose of this invention.

Among the effects obtained with the optical pickup position control method of the present invention as described above, by the first procedure, the optical pickup is once fed in the direction from the base position to the maximum feed position; by the second procedure, when returning to the base position, the out-of-step noise generated from the stepping motor can be reduced; and by the third procedure, the optical pickup can be appropriately positioned.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

We claim:

1. An optical pickup position control method that uses a stepping motor to control the relative position of an optical disk with respect to an optical pickup, for recording and/or playing information by shining an optical spot from said optical pickup onto said optical disk, said optical pickup being movable between a base position, a center position and a maximum feed position, wherein said method comprises:

a) a first procedure that gives said stepping motor a control command that moves said optical pickup, by a feed amount that is smaller than a maximum feed amount from said base position that is the base for the control as far as the maximum feed position of said stepping motor, in the direction from said base position to said maximum feed position, b) a second procedure that gives said stepping motor a control command that moves said optical pickup by said maximum feed amount in the direction toward said base position, and c) a third procedure that gives said stepping motor a control command that moves said optical pickup in the direction from said base position toward said maximum feed position by a center position feed amount from said base position as far as the center position that yields the pre-measured optimum jitter characteristics of the output signal of said optical pickup.

2. The method as described in claim 1, wherein the feed amount in said first procedure is the difference between said maximum feed amount and said center position feed amount.

3. The method as described in claim 1 or 2, further comprising an optimum position adjustment procedure that, following said third procedure, detects the jitter value of the output signal of said optical pickup, position-adjusts said optical pickup so that the jitter characteristics for said optical disk are optimum, and stores the adjustment feed amount from the base position for the adjusted optimum position, and a fourth procedure that, upon termination of recording and/or playback of information by said optical pickup, gives said stepping motor a control command that moves said optical pickup by the difference between this adjustment feed amount and said center position feed amount.

4. The method as described in claim 1, wherein control of the relative position of said optical disk and said optical pickup is tilt control, and said tilt control is control of said optical disk in the radial skew direction.

5. The method as described in claim 2, wherein control of the relative position of said optical disk and said optical pickup is tilt control, and said tilt control is control of said optical disk in the radial skew direction.

6. The method as described in claim 3, wherein control of the relative position of said optical disk and said optical pickup is tilt control, and said tilt control is control of said optical disk in the radial skew direction.

* * * * *